S. SUITS.
ILLUMINATING DEVICE FOR VEHICLES.
APPLICATION FILED FEB. 14, 1910.

994,695.

Patented June 6, 1911.

2 SHEETS—SHEET 1.

Witnesses.
Inventor.
Seymour Suits
by Jas. H. Churchill
Atty.

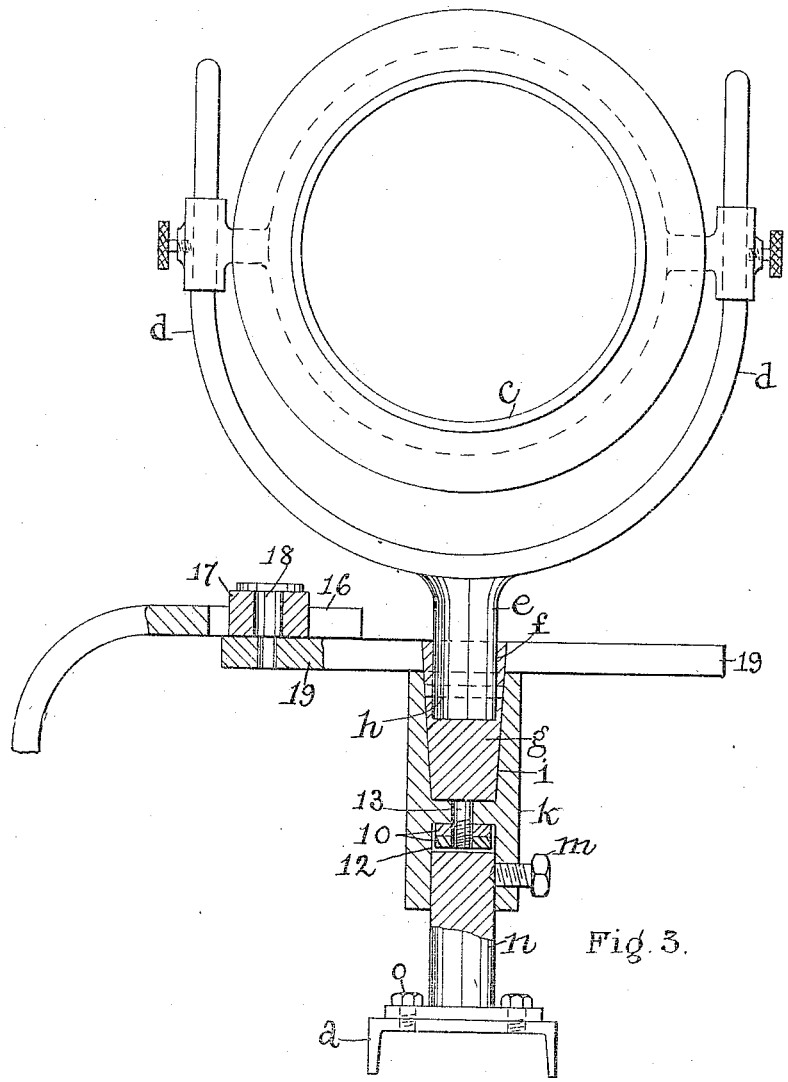

UNITED STATES PATENT OFFICE.

SEYMOUR SUITS, OF NEWARK, NEW JERSEY, ASSIGNOR OF ONE-HALF TO PETER C. BRASHEAR, OF NEW YORK, N. Y.

ILLUMINATING DEVICE FOR VEHICLES.

994,695.

Specification of Letters Patent. Patented June 6, 1911.

Application filed February 14, 1910. Serial No. 543,714.

*To all whom it may concern:*

Be it known that I, SEYMOUR SUITS, a citizen of the United States, residing in Newark, county of Essex, and State of New Jersey, have invented an Improvement in Illuminating Devices for Vehicles, of which the following description, in connection with the accompanying drawings, is a specification, like letters on the drawings representing like parts.

This invention has for its object to provide a vehicle mounted on wheels, with an illuminating device, which is mounted on the vehicle so as to be capable of turning in a plane substantially at right angles to the path of movement of the vehicle, and which is preferably operatively connected with the wheels or with the running gear of the vehicle, so as to be turned by the turning of the wheels, whereby the lamp or device is caused to illuminate the path to be traveled in advance of the turning of the body of the vehicle.

The invention is applicable for use on electric cars, railway engines and especially automobiles.

Figure 1:
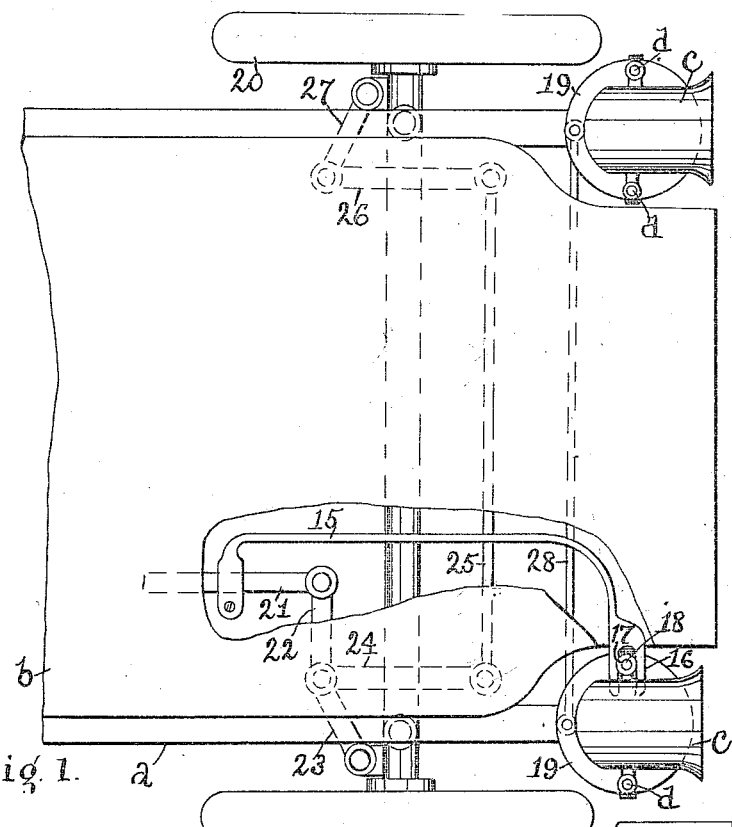
Figure 2:
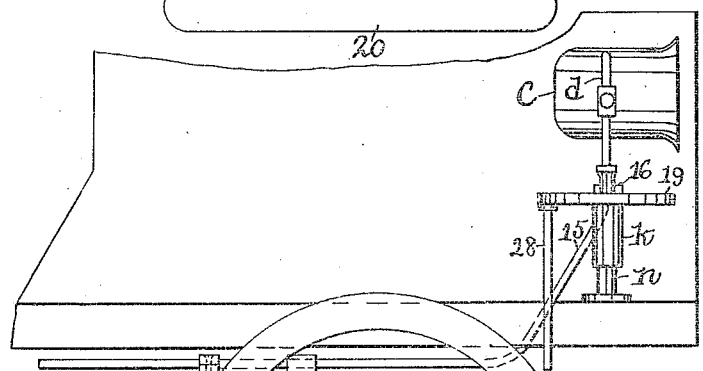

Figure 1 represents in plan view with parts broken away, a sufficient portion of an automobile provided with an illuminating device mounted to respond to the turning movement of the front wheels of the vehicle. Fig. 2, a side elevation of the parts shown in Fig. 1, and Fig. 3, a detail in elevation and section, showing one method of mounting the light shown in Fig. 1.

Referring to the drawing, *a* represents the frame of an automobile of any suitable, usual or desired construction, *b* the hood, and *c* the usual searchlights or lamps commonly employed and located at the front end of the vehicle on opposite sides thereof.

To enable the path or roadway to be illuminated at the turns as well as in the straight portions or stretches, is the object of this invention, and in the present instance I have illustrated one arrangement or construction of apparatus for accomplishing this result. To this end, each lamp or light *c* is secured to a support which is rotatably mounted, so that the lamp or light *c* can turn in a plane substantially at right angles to the path of movement of the vehicle. The support referred to is represented as the usual yoke or forked arms *d*, which are provided with a centrally disposed spindle or stud *e*, extended into a socket *f* in the upper end of a tapering plug or pin *g* and firmly secured therein by a cross pin *h* or in any other suitable manner. The tapering plug or pin *g* constitutes a pivot for the yoke or lamp support *d* and turns in a tapered socket *i* in the upper end of a socket piece or sleeve *k*, which is preferably secured as by a set screw *m* on a stud or post *n* fastened by the screws *o* or otherwise, to the frame *a* of the vehicle. The pivot pin *g* is locked against upward displacement by spanner lock nuts 10 located in the socket 12 in the lower part of the sleeve or socket piece *k*, and engaging a threaded extension 13 of said pivot pin or plug *g*.

Provision is made for rotating the pivot pin or plug *g*, and in the present instance, I have shown one construction or arrangement for this purpose, which consists of a rod or arm 15 provided at one end with forks 16, which engage a roller 17 on a pin 18 carried by a plate or disk 19, which is attached to or forms part of the pivot pin or plug *g*. The forked arm or rod 15 is suitably fastened at its other end to suitable mechanism, preferably the steering mechanism for the front wheels 20 of the vehicle.

In the present instance, the rod or arm 15 is shown as secured to a rod 21 forming part of the steering mechanism of the vehicle, which mechanism may be of any suitable or well-known construction, said rod or arm being connected to a lever 22, which is connected with the knuckle arm 23 of one of the front wheels, and is also connected by the links 24, 25, 26, with the knuckle arm 27 of the other front wheel. It will thus be seen, that when the front wheels 20 of the vehicle are turned by operating the steering mechanism in the usual manner, the forked arm or rod 15 is simultaneously moved so as to rotate the pivot pin or plug *g* of one lamp support in the same direction that the wheels 20 are turned, and by means of a link 28 connecting the plate 19 of one lamp pivot with the plate 19 of the lamp pivot on the opposite side of the vehicle, both lamps are simultaneously turned with the front wheels of the vehicle; and the rays of light are projected in a direction at an angle to the length of the vehicle, and as a result, the roadway or path about to be traveled by the vehicle is illuminated before the body of the vehicle enters the said path and assumes a parallel relation thereto. This is especially desirous, when the roadway contains curved or sharp turns, as for instance, when one street intersects another or makes a substantially right angled turn.

The lights or lamps with which automobiles are now equipped, have a fixed relation to the automobile, so that when the automobile is traveling on a curve in the road, the light is projected off to one side of the road and the part of the road which the car is approaching or entering is but poorly lighted, whereas with this invention, it becomes fully lighted while the car is making the curve or turn.

The advantage of mounting the lamps or lights so as to have a lateral movement with relation to the vehicle body, is especially brought out when the vehicle travels from one street into a street running substantially at right angles thereto, for in this case the street about to be entered can be illuminated when the front wheels are making the turn and while the body of the vehicle is substantially at right angles to the street being entered.

It is preferred to automatically move the lights or lamps laterally with relation to the car body through mechanism which is movable with or responsive to the movement of the front wheels of the vehicle, but it is not desired to limit the invention in this respect, as it is evident that the mechanism for moving the lamps may be disconnected from the front wheels. It is preferred to have the steering mechanism connected with the lamps as by so doing, the apparatus is materially simplified.

It may be preferred to use the pivotal construction shown in Figs. 2 and 3, but it is not desired to limit the invention to the particular construction shown.

The invention is herein shown as embodied in an automobile, but it is not desired to limit it in this respect, as it is also well adapted for use on electric cars, railway engines and like vehicles.

In the present instance, I have shown the vehicle as provided with two lights located on opposite sides of the vehicle, but I do not desire to limit the invention in this respect as a single light centrally located could be used to advantage.

Claims.

1. The combination with an automobile provided with a front pair of wheels capable of turning laterally with relation to the body of the automobile, of a stud or post erected upon the frame of the automobile, a sleeve or socket piece secured to said post, a pivot pin or plug rotatably mounted in said socket piece above said post, means for securing said pivot pin or plug in said socket piece against upward displacement, a yoke attached to said pivot pin or plug, a lamp secured to said yoke and means connected with the pivot pin or plug above said post for turning said pivot pin in its socket, substantially as described.

2. The combination with an automobile provided with a front pair of wheels capable of turning laterally with relation to the body of the automobile, of a stud or post erected upon the frame of the automobile, a sleeve or socket piece secured to said post and provided in its upper portion with a tapering socket, a tapering pivot pin or plug fitted into said tapering socket to turn therein above said post, means for securing said tapered pivot pin or plug in said tapering socket against upward displacement, a yoke attached to said pivot pin or plug, a lamp secured to said yoke, and means connected with said pivot pin for turning the same in its socket, substantially as described.

3. The combination with an automobile provided with a front pair of wheels capable of turning laterally with relation to the body of the automobile, of a stud or post erected upon the frame of the automobile, a sleeve or socket piece secured to said post and provided in its upper portion with a tapering socket, a tapering pivot pin or plug fitted into said tapering socket to turn therein above said post, a rod on the bottom of said pin or plug extended through the bottom wall of the tapered socket, means on said rod coöperating with the bottom wall of the tapered socket to limit the upward movement of the tapered pin or plug in its socket, a yoke attached to said pivot pin or plug, a lamp secured to said yoke, and means connected with the pivot pin or plug above said post for turning said pivot pin or plug in its socket, substantially as described.

In testimony whereof, I have signed my name to this specification in the presence of two subscribing witnesses.

SEYMOUR SUITS.

Witnesses:
JAS. H. CHURCHILL,
J. MURPHY.